Patented Feb. 12, 1952

2,585,155

UNITED STATES PATENT OFFICE 2,585,155

BENZOTHIAZOLE-2-DIMETHYLSULFIN-AMIDE AND PROCESS FOR PREPARING THE SAME

Georges Mingasson, Paris, France, assignor to Societe Anonyme de Matieres Colorantes et Produits Chimiques Francolor, Paris, France, a French company No Drawing. Application October 29, 1949, Serial No. 124,478

6 Claims. (Cl. 260—306.6)

This invention relates to the production of an organic compound containing nitrogen, sulphur and oxygen and to its use as a vulcanisation accelerator.

The present application is a continuation-in-part of application Serial No. 9,342, filed February 18, 1948, now abandoned.

There have already been described products resulting from the action of oxidising agents on mixtures of secondary amines and 2-mercaptobenzothiazole or 2:2'-dibenzothiazyldisulphide.

This reaction has already been studied in the case of a great number of secondary amines and has already formed the subject of several patents, in particular United States Patent No. 2,417,989, dated March 25, 1947, and United States Patent No. 2,419,283, dated April 22, 1947. Experiments made up to the present have led solely to substances containing carbon, hydrogen, nitrogen and sulphur, which have generally been considered to be thiazylsulphenamides. For example, starting from 2-mercaptobenzonthiazole, the reaction proceeds according to the folowing Equation I:

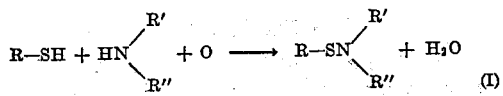

wherein R is a benzothiazyl radical, R' is hydrogen or a hydrocarbon radical and R'' is a hydrocarbon radical.

Among the secondary amines to be employed in this reaction dimethylamine has been mentioned, but there have never been given any precise indications of the conditions of its use.

It has now been found that there can be obtained a new substance, which differs from the sulphenamides formed according to reaction (I) described above by the fact that it contains oxygen in its molecule, by effecting the oxidation of 2-mercaptobenzothiazole or 2:2'-dibenzothiazlydisulphide in presence of water and dimethylamine by means of chlorites of alkali metals or of hypochlorites of alkali metals or of hydrogen peroxide, provided that the following conditions are observed:

(1) An excess of dimethylamine must be used, that is to say, a quantity exceeding 1 gram molecule for each gram molecule of 2-mercaptobenzothiazole, or of each ½ gram molecule of 2:2'-dibenzothiazyldisulphide. It is thus necessary to use more than one molecular part of dimethylamine for each molecular part of benzothiazole combined in the sulphur compound, i. e. for each two atoms of sulphur contained in the sulphur compound.

(2) In the case where the oxidation of the mixture is effected with hypochlorite of an alkali metal such volume of reagents is used that for each gram molecule of dimethylamine taken, the volume of the mixture at the end of the reaction is less than 700 c.c.

The reaction mixture may contain, in addition to water, solvents miscible with water such as pyridine or alcohol.

The new substance, benzothiazole-2-dimethylsulphinamide, is obtained directly in the form of white crystals melting at 125° C., only slightly soluble in the cold in ether or alcohol, but soluble in the hot in alcohol or benzene. It can be re-crystallised by cooling from these latter solvents. Its ultimate composition corresponds to the empirical formula $C_9H_{10}ON_2S_2$ and from its properties the new substance appears to be the dimethylamide of benzothiazyl-2-sulphinic acid of the following Formula A:

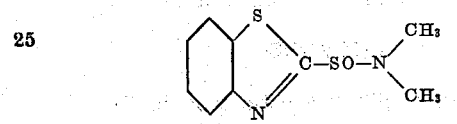

It is formed according to the following Equation II or Equation III, depending upon whether there is used as the starting material 2-mercaptobenzothiazole or 2:2'-dibenzothiazyldisulphide

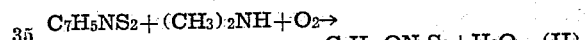
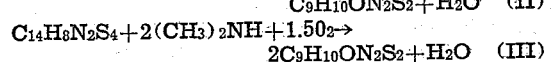

On studying the oxidation of a mixture of 2-mercaptobenzothiazole and dimethylamine by sodium hypochlorite, it has been noted that by effecting the reaction under some conditions slightly different from those just indicated above, there can be obtained (in addition to the oxygenated substance of the present invention) a variable quantity of an oily substance, apparently formed according to Equation I, which by re-crystallisation from petrol ether gives a crystalline product very soluble in the cold in alcohol and ether, melting at 37° C. and having an analysis which indicates an empirical formula $C_9H_{10}N_2S_2$. It does not contain any oxygen and is apparently composed of the dimethylbenzothiazole-2-sulphenamide whose preparation by a different process is described in German Patent No. 586,351. Its formation according to Equation I is favoured by reduction in the quantity of dimethylamine in the reaction medium and it is generally accompanied by the formation of 2:2'-dibenzothiazyldisulphide; on the other hand, the production of the new substance of the formula $C_9H_{10}ON_2S_2$ is favoured by a high concentration of dimethylamine. The preparation of either of these products is thus effected under conditions unfavourable for the production of the other. The yield of the new substance of the formula $C_9H_{10}ON_2S_2$ increases as the quantity of oxidising agent is increased beyond that necessary for the formation of the sulphenamide and attains its maximum with double that quantity, that is to say, when that quantity is reached which is theoretically necessary for the formation of the new substance.

As has already been indicated above, the new substance of the present invention is distinguished from the dimethylbenzothiazole-2-sulphenamide previously described, by the fact that it contains oxygen, as is shown clearly by the following analysis:

|  | C | H | S | N | O[1] |
|---|---|---|---|---|---|
| Found | 48.1 | 4.53 | 28.3 | 11.85 | 7.22 |
|  | 47.9 | 4.51 | 28.6 | 11.92 | 7.07 |
| Calculated for $C_9H_{10}ON_2S_2$ | 47.78 | 4.42 | 28.31 | 12.38 | 7.07 |

[1] By difference.

The two products have different melting points and different chemical properties. Among the different chemical properties may be mentioned in particular the decomposition by means of acids and alkalis.

By the action of dilute hydrochloric acid in the hot the new substance of the present invention gives benzothiazole, sulphur dioxide and dimethylamine, the latter two in the theoretical amounts corresponding to the formula $$C_9H_{10}ON_2S_2$$

By the action of dilute caustic soda in the hot the new substance of the invention gives 2-hydroxy-benzothiazole, orthoaminothiophenol, sodium sulphite and sodium sulphide and, quantitatively, dimethylamine.

The known substance, dimethylbenzothiazole-2-sulphenamide is immediately decomposed by the action of dilute hydrochloric acid in the cold into 2:2'-dibenzothiazldisulphide and dimethylamine hydrochloride without the formation of appreciable quantities of sulphur dioxide.

The new substance forms an excellent vulcanisation accelerator for natural as well as synthetic rubber. It is distinguished from the usual accelerators by the fact that it only begins to react at relatively high temperatures, so that its use is very safe. It gives the vulcanisates excellent mechanical properties. It is distinguished from the sulphenamides prepared with the lower members of the series of secondary aliphatic amines by its greater stability and its crystalline form, which allows of its being obtained in a greater state of purity.

The figures given in the following table confirm the superiority of the new substance according to the invention in contrast to benzothiazole-2-diethylsulphenamide which is one of the most important vulcanisation accelerators in the class of sulphenamides.

| Temperature, °C | Curing time in minutes— | |
|---|---|---|
|  | I | II |
| 110 | 120 | 80 |
| 120 | 58 | 35 |
| 125 | 30 | 20 |
| 130 | 20 | 15 |

Composition of the mixture used for the tests in the above table:

Parts by weight
Natural rubber (smoked sheets) _____ 100
Zinc oxide _____ 5
Sulphur _____ 3
Stearic acid _____ 1

For the test I described in the above table the mixture also contained one part by weight of the new product of the invention. For the test II of the above table the mixture also contained instead of the product of the invention one part by weight of commercial benzothiazole-2-diethylsulphenamide.

In the examples of the preparation and use of this substance, given hereinafter in an illustrative and not limiting way, the parts by weight may be in any units and where some parts are by weight and others by volume, one part by volume is the volume of one part by weight of water.

*Example I*

To a solution of 16.7 parts by weight of 2-mercaptobenzothiazole in 42 parts by volume of a solution in water of dimethylamine containing 380 grams per litre there is added all at once a solution of 9 parts by weight of sodium chlorite (85% $NaClO_2$) in 50 parts by weight of water. The mixture is left at a temperature of 40° C. for 24 hours. After this time, the crystalline magma which is formed is filtered off, then this magma is washed and dried. There is thus obtained the new substance of the invention which has the characteristics set forth above.

*Example II*

To a solution of 16.7 parts by weight of 2-mercaptobenzothiazole in 15 parts by volume of a solution of dimethylamine containing 450 grams of base per litre there is added, while mixing, 10 parts by weight of solid sodium chlorite (85% $NaClO_2$). The temperature is maintained at about 40° C. until the oxidation has been completed. The product of reaction separates in crystalline form and has the characteristics of the new substance of the invention.

*Example III*

To a solution of 16.7 parts by weight of 2-mercaptobenzothiazole in 25 parts by volume of an aqueous solution of dimethylamine of the same concentration as in Example II, there is added a little at a time an aqueous solution of 10 parts by weight of sodium chlorite (85% $NaClO_2$) in 25 parts by weight of water. The apparatus is provided with a reflux condenser and the temperature is allowed to rise to 60° C. while the solution of chlorite is being introduced. Under these conditions the duration of the reaction is reduced to one or two hours. The product separates in crystalline form in the course of the addition and is isolated as described in Example I.

*Example IV*

To a solution of 33.4 parts by weight of 2- mercaptobenzothiazole in 60 parts by volume of an aqueous solution of dimethylamine containing 450 grams of the base per litre there is introduced with mixing over a period of three to four hours and at about 30° C. 150 parts by volume of a solution of sodium hypochlorite containing 10 grams of NaClO per 100 c. c. The product of the reaction precipitates in crystalline form in the course of the addition. When all the hypochlorite has been used up the product is filtered, washed with water and dried. The product obtained possesses the same characteristics as the product obtained according to each of the preceding examples.

*Example V*

To a solution of 33.4 parts by weight of 2-mercaptobenzothiazole in 50 parts by volume of an aqueous solution of dimethylamine containing 450 grams of the base per litre there are added over 4 hours at a temperature of 20° C. 63 parts by volume of an aqueous solution of hydrogen peroxide containing 20 grams of $H_2O_2$ per 100 c. c. There separates a crystalline product the same as that of the preceding examples.

*Example VI*

There are first dissolved 16.6 parts by weight of 2:2′-dibenzothiazyldisulphide in 30 parts by volume of an aqueous solution of dimethylamine containing 450 grams of the base per litre. There is added to this solution a solution of 8.3 parts by weight of sodium chlorite (82% $NaClO_2$) in 15 parts by weight of water at a temperature of 40 to 45° C. which is maintained for 24 hours. There separates the same product as that obtained in each of the preceding examples.

*Example VII*

There are dissolved 16.6 parts by weight of 2:2′-dibenzothiazyldisulphide in 32 parts by volume of a solution in water of dimethylamine (43% by volume). There are slowly added 52 parts by weight of 10% aqueous hydrogen peroxide. The product which is precipitated in the crystalline state is isolated as described in Example I.

*Example VIII*

The following mixture is prepared:

| | Parts by weight |
|---|---|
| Natural rubber (smoked sheets) | 100 |
| Zinc oxide | 5 |
| Sulphur | 3 |
| Stearic acid | 1 |
| Product prepared according to the invention | 1 |

The mixture is vulcanised at 130° C. for 45 minutes.

The vulcanisate has a breaking stress of 250 kg./cm.² with an elongation of 665%.

*Example IX*

The following mixture is prepared:

| | Parts by weight |
|---|---|
| Natural rubber | 100 |
| "Cosmobile" black | 50 |
| Pine tar | 5 |
| Zinc oxide | 5 |
| Sulphur | 2.5 |
| Stearic acid | 2 |
| Product prepared according to the invention | 1.5 |

If the mixture is heated to 125° C. for 30 minutes the rubber is not vulcanized.

If on the contrary it is heated for 15 minutes to 140° C. vulcanisation occurs under excellent conditions and the vulcanisate has a breaking stress of 230 kg./cm.² with an elongation of 580%. If it is heated to 140° C. for 30 minutes the vulcanisate obtained has a breaking stress of 240 kg./cm.² with an elongation of 535%.

*Example X*

The natural rubber in the mixture according to Example IX is replaced by synthetic rubber of the type known in industry under the name of GR–S.

By heating the mixture for 30 minutes to 140° C. there is obtained a vulcanisate which has a breaking stress of 148 kg./cm.² with an elongation of 476%.

If the mixture is heated to 125° C. only, no vulcanisation occurs.

I declare that what I claim is:

1. As a new product, benzothiazole-2-dimethylsulphinamide in the form of crystals melting at about 125° C. and having the following formula:

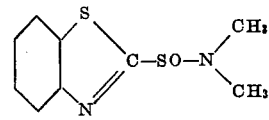

2. The process for the preparation of a product of the following formula:

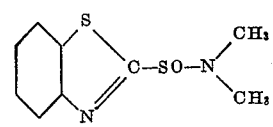

which comprises treating with sodium chlorite an organic sulphur compound selected from the group which consists of 2-mercaptobenzothiazole and 2,2′-dibenzothiazyldisulphide in the presence of water and of a quantity of dimethylamine exceeding one molecular proportion for each molecular proportion of benzothiazole combined in said organic sulphur compound.

3. A process for the preparation of a product of the following formula:

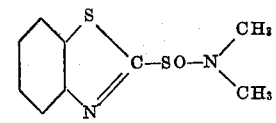

which comprises treating with sodium chlorite 2-mercaptobenzothiazole in the presence of a concentrated aqueous solution of dimethylamine, at a temperature of approximately 40° C., the quantity of dimethylamine being about 16 parts by weight for 16.7 parts by weight of the 2-mercaptobenzothiazole.

4. A process for the preparation of a product of the following formula:

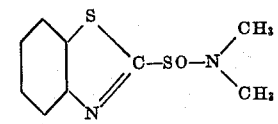

which comprises treating with sodium chlorite 2-mercaptobenzothiazole in the presence of a concentrated aqueous solution of dimethylamine, at a temperature of approximately 40° C., the quantity of dimethylamine being about 6.7 parts by weight for 16.7 parts by weight of the 2-mercaptobenzothiazole.

5. A process for the preparation of a product of the following formula:

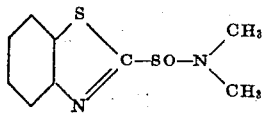

which comprises treating with sodium chlorite 2-mercaptobenzothiazole in the presence of a concentrated aqueous solution of dimethylamine, at a temperature of approximately 60° C., the quantity of dimethylamine being about 11.25 parts by weight for 16.7 parts by weight of the 2-mercaptobenzothiazole.

6. A process for the preparation of a product of the following formula:

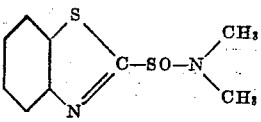

which comprises treating with sodium chlorite 2,2'-dibenzothiazyldisulphide in the presence of a concentrated aqueous solution of dimethylamine, at a temperature of approximately 40–45° C. the quantity of dimethylamine being about 13.5 parts by weight for 16.6 parts by weight of the 2,2'-dibenzothiazyldisulphide.

GEORGES MINGASSON.

REFERENCES CITED

The following references are of record in the file of this patent:

UNITED STATES PATENTS

| Number | Name | Date |
|---|---|---|
| Re. 19,286 | Zaucker et al. | Aug. 21, 1934 |
| 2,339,552 | Carr | Jan. 18, 1944 |
| 2,417,989 | Moore | Mar. 25, 1947 |
| 2,419,293 | Paul | Apr. 22, 1947 |